(12) United States Patent
Donatelli et al.

(10) Patent No.: US 12,126,152 B2
(45) Date of Patent: Oct. 22, 2024

(54) BALL MOUNT WITH INTEGRATED CABLE GLAND

(71) Applicant: APG Vision LLC, Allison Park, PA (US)

(72) Inventors: Gregory M. Donatelli, Hatboro, PA (US); Christopher C. McGeary, Gibsonia, PA (US); David M. McMeekin, Butler, PA (US); Tyler William Dulaney, Greenville, PA (US)

(73) Assignee: APG VISION LLC, Allison Park, PA (US)

( * ) Notice: Subject to any disclaimer, the term of this patent is extended or adjusted under 35 U.S.C. 154(b) by 127 days.

(21) Appl. No.: 17/729,513

(22) Filed: Apr. 26, 2022

(65) Prior Publication Data

US 2022/0349498 A1 Nov. 3, 2022

Related U.S. Application Data

(60) Provisional application No. 63/181,478, filed on Apr. 29, 2021.

(51) Int. Cl.
*H02G 15/013* (2006.01)
*F16L 3/16* (2006.01)
*F16L 13/16* (2006.01)

(52) U.S. Cl.
CPC ............. *H02G 15/013* (2013.01); *F16L 3/16* (2013.01)

(58) Field of Classification Search
CPC ......... H02G 15/013; H02G 11/00; F16L 3/16; F16L 27/04; F16M 11/14; F21V 21/29

USPC .................................................. 248/288.31
See application file for complete search history.

(56) References Cited

U.S. PATENT DOCUMENTS

| | | | | | |
|---|---|---|---|---|---|
| 1,187,642 | A | * | 6/1916 | Milz | F16L 27/04 285/146.1 |
| 1,500,921 | A | * | 7/1924 | Mogens | F16L 11/18 403/56 |
| 3,033,596 | A | * | 5/1962 | Pearring | F21V 21/29 285/261 |
| 3,646,496 | A | * | 2/1972 | Williams | H01R 13/6582 174/75 C |
| 4,030,741 | A | | 6/1977 | Fidrych | |
| 4,842,059 | A | * | 6/1989 | Tomek | E21B 17/206 285/146.1 |
| 4,853,965 | A | * | 8/1989 | Blonski | F16M 11/10 403/123 |

(Continued)

FOREIGN PATENT DOCUMENTS

| | | | | | |
|---|---|---|---|---|---|
| CN | 110333173 | A | * | 10/2019 | ........... H02G 15/013 |
| CN | 113904286 | A | * | 1/2022 | ........... H02G 15/013 |

(Continued)

*Primary Examiner* — Taylor Morris
(74) *Attorney, Agent, or Firm* — Foley & Lardner LLP

(57) ABSTRACT

A ball mount assembly comprising a ball mount including a body having an opening and a base, the ball mount having an internal passage extending through the opening of the body in an axial direction of the ball mount; a compression fitting secured to the ball mount; and a sealing insert disposed in the internal passage of the ball mount, wherein the sealing insert is interposed between the compression fitting and the ball mount in the internal passage, and wherein the internal passage of the ball mount is defined by a first sidewall and a second sidewall.

5 Claims, 18 Drawing Sheets

(56) References Cited

U.S. PATENT DOCUMENTS

| | | | |
|---|---|---|---|
| 5,110,224 A * | 5/1992 | Taylor | G02B 6/4461 385/25 |
| 5,132,492 A * | 7/1992 | Wieder | H02G 3/0633 174/535 |
| 5,197,767 A * | 3/1993 | Kimura | H02G 11/00 403/114 |
| 6,029,293 A * | 2/2000 | Paterson | E03C 1/057 4/623 |
| 6,053,504 A * | 4/2000 | Winterhoff | H02G 15/013 24/274 WB |
| 6,328,270 B1 * | 12/2001 | Elberbaum | F16L 27/04 403/27 |
| 6,376,766 B1 * | 4/2002 | Bartholoma | H01R 13/5816 174/359 |
| 6,578,800 B2 * | 6/2003 | Stefan | H02G 3/0406 248/52 |
| 6,629,651 B1 * | 10/2003 | Male | E03C 1/025 239/587.5 |
| 6,846,201 B2 * | 1/2005 | Lazaro, Jr. | H01R 13/65912 439/607.17 |
| 7,296,771 B2 | 11/2007 | Kalis et al. | |
| D588,903 S | 3/2009 | Carnevali | |
| 7,534,965 B1 | 5/2009 | Thompson | |
| 7,781,685 B2 * | 8/2010 | Bartholoma | H01R 13/5205 174/654 |
| 7,938,451 B2 * | 5/2011 | Taillon | F16L 3/16 285/272 |
| 8,201,785 B2 | 6/2012 | Goodman | |
| 8,201,800 B2 | 6/2012 | Filipiak | |
| 8,419,309 B2 | 4/2013 | Wimberley | |
| 8,602,662 B1 | 12/2013 | Mans | |
| 8,690,599 B2 * | 4/2014 | Bartholoma | H02G 3/0666 439/98 |
| 8,910,914 B2 * | 12/2014 | Bigeh | H04R 1/08 403/114 |
| 8,919,221 B2 | 12/2014 | Chiou | |
| 9,188,280 B2 | 11/2015 | Congdon | |
| 9,385,520 B1 * | 7/2016 | Gretz | H02G 15/013 |
| 9,415,520 B2 | 8/2016 | Sanders et al. | |
| 9,436,067 B2 * | 9/2016 | Chen | G03B 17/561 |
| 9,568,145 B2 | 2/2017 | Carnevali | |
| 9,625,791 B2 | 4/2017 | Harrison | |
| 9,880,451 B2 | 1/2018 | Clearman | |
| 10,082,726 B2 * | 9/2018 | Fagerkvist | F16C 11/06 |
| 10,178,209 B1 | 1/2019 | Hesse | |
| 10,547,769 B2 | 1/2020 | Harrison | |
| 10,548,380 B2 | 2/2020 | Rayner et al. | |
| 10,642,133 B2 | 5/2020 | Clearman | |
| 10,787,866 B2 * | 9/2020 | Thomas | E21B 23/14 |
| 10,801,664 B1 | 10/2020 | Nighswander et al. | |
| D904,169 S | 12/2020 | Nighswander et al. | |
| D904,862 S | 12/2020 | Nighswander et al. | |
| D904,912 S | 12/2020 | Nighswander et al. | |
| 11,283,198 B2 * | 3/2022 | Garcia-Herreros | H02K 5/225 |
| 11,293,589 B2 | 4/2022 | Nighswander et al. | |
| 2004/0119246 A1 * | 6/2004 | Woller | H02G 3/088 277/602 |
| 2007/0124923 A1 * | 6/2007 | Kogure | H02G 11/00 29/748 |
| 2012/0315780 A1 * | 12/2012 | Montena | H01R 13/5219 439/275 |
| 2013/0168957 A1 * | 7/2013 | Kaplan | F16L 27/04 285/146.1 |
| 2013/0256467 A1 * | 10/2013 | Aumiller | H01R 13/187 248/49 |
| 2014/0030903 A1 * | 1/2014 | Magno | H02G 15/046 29/863 |
| 2015/0137456 A1 * | 5/2015 | Lund | F16J 15/022 277/627 |
| 2016/0039098 A1 | 2/2016 | Sanders et al. | |
| 2016/0141853 A1 * | 5/2016 | Findley | H02G 15/007 174/653 |
| 2019/0123534 A1 * | 4/2019 | Pastusek | H02G 3/0691 |
| 2019/0190190 A1 * | 6/2019 | Bourgeas | G02B 6/4459 |
| 2020/0161848 A1 * | 5/2020 | Bielen | G01D 11/245 |
| 2020/0316792 A1 | 10/2020 | Nighswander et al. | |
| 2020/0358276 A1 * | 11/2020 | Schönfeld | H02G 15/013 |
| 2021/0013707 A1 * | 1/2021 | Santoro | B29C 70/745 |
| 2021/0234354 A1 * | 7/2021 | Reid | H02G 15/013 |
| 2022/0403973 A1 * | 12/2022 | Donatelli | F16M 13/02 |

FOREIGN PATENT DOCUMENTS

| | | | | |
|---|---|---|---|---|
| DE | 3734873 A1 * | 4/1989 | | H02G 15/013 |
| DE | 10 2009 059 211 A1 | 6/2011 | | |
| DE | 20 2012 012 427 U1 | 1/2013 | | |
| DE | 102012107406 A1 * | 5/2014 | | H02G 15/007 |
| DE | 102016120039 A1 * | 4/2018 | | H02G 15/013 |
| DE | 102017212582 A1 * | 1/2019 | | H02G 15/013 |
| EP | 1 675 244 B1 | 6/2006 | | |
| EP | 1890368 A2 * | 2/2008 | | H02G 15/013 |
| EP | 2 369 211 A2 | 9/2011 | | |
| EP | 2 369 211 B1 | 9/2011 | | |
| EP | 2 469 671 B1 | 6/2012 | | |
| EP | 2 492 566 A2 | 8/2012 | | |
| EP | 3787123 A1 * | 3/2021 | | H01R 13/6592 |
| FR | 2728047 A1 * | 6/1996 | | F16L 5/02 |
| GB | 2523098 A * | 8/2015 | | F16J 15/022 |
| KR | 101728442 B1 * | 4/2017 | | H02G 15/013 |
| KR | 20210157721 A * | 12/2021 | | H02G 3/088 |
| KR | 102558748 B1 * | 8/2023 | | H02G 15/043 |
| WO | WO-2007118334 A1 * | 10/2007 | | F16L 27/0816 |
| WO | WO-2011051005 A2 * | 5/2011 | | H02G 15/013 |
| WO | WO-2019134768 A1 * | 7/2019 | | F16L 3/12 |

\* cited by examiner

BALL MOUNT WITH INTEGRATED CABLE GLAND

This application claims the benefit of and priority to U.S. Provisional Application No. 63/181,478, filed Apr. 29, 2021. The entire contents of this provisional application are incorporated herein by reference.

BACKGROUND

In certain hazardous or industrial applications, electrical devices such as cameras, lighting, sensors, and machine vision, or the components thereof, or the cables extending therefrom, may be exposed to harsh environments which may be damaging to these electrical devices. These damaging conditions include exposure to extreme temperatures, water, or high humidity levels; ingress of airborne particulates such as corrosive agents or other foreign objects; or physical impact.

Semiconductors, for example, are extremely sensitive to contamination. In order to provide protection to electrical systems operating in these hazardous or industrial applications from damaging conditions, wire conduits, including chemical-resistant, heat-reflective, water-proof, or high-strength protective sleeving, may be applied to the cables connected to an electrical device to protect the electrical system from exposure, damage, or deterioration. Additionally, high strength, corrosion resistant, enclosures may be utilized to house industrial electronics to better enable these electrical devices to withstand various harsh conditions.

SUMMARY

In industrial and manufacturing environments, these electrical devices are typically adjustably fixed to a conventional mount, bracket, or stand. Conventional adjustable mounts, brackets, or stands configured to accommodate electrical devices, or enclosures for the same, are typically configured to rotate, tilt, and/or pan. However, protective enclosures for certain electrical devices, and the cables extending therefrom, may limit the adjustability of said electrical devices when attached to conventional mounts. Additionally, the conventional mounts, brackets, or stands may subject these electrical devices, and the cables extending therefrom, to damage resulting from harsh operating conditions.

As such, there is a need for a highly-reliable mount that provides maximum protection to electrical systems from harsh industrial environments without compromising adjustability.

At least one embodiment relates to a mount assembly comprising a mount configured to support an enclosure in an adjustable manner, the mount including a body having an opening and a base, the mount having an internal passage extending through the opening of the body in an axial direction of the mount; a compression fitting secured to the mount; and a sealing insert disposed in the internal passage of the mount, wherein the sealing insert is interposed between the compression fitting and the mount in the internal passage.

Another embodiment relates to a ball mount assembly comprising a ball mount including a body having an opening and a base, the ball mount having an internal passage extending through the opening of the body in an axial direction of the ball mount; a compression fitting secured to the ball mount; and a sealing insert disposed in the internal passage of the ball mount, wherein the sealing insert is interposed between the compression fitting and the ball mount in the internal passage, and wherein the internal passage of the ball mount is defined by a first sidewall and a second sidewall.

Yet another embodiment relates to a ball mount assembly for a leak resistant enclosure for an electrical device, the mount assembly comprising a ball mount including a body having a first opening and a base having a second opening configured to communicate with a leak resistant enclosure, the ball mount having an internal passage extending from the first opening of the body to the second opening of the base in an axial direction of the ball mount; a fitting secured to the ball mount; and a sealing insert disposed in the internal passage of the ball mount.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals, symbols, or terms generally identify similar elements, unless context dictates otherwise, and in which:

FIG. 1B is a rear perspective view of the mounted enclosure system shown in

FIG. 1A.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, disclosed herein is an adjustable mount assembly having a sealing device integrated therein and which may be directly connected to and/or integrated with a device, apparatus, enclosure, or mount. Various aspects of adjustable mount assemblies and methods described herein achieve technical advantages including but not limited to those noted herein. For ease of reference, embodiments in the present disclosure are described specifically with respect to an adjustable mount assembly for an industrial enclosure, hereinafter referred to as a mounted enclosure system. However, it is to be understood that the apparatus and methods described herein apply to and can be used for other applications.

Overview of Mounted Enclosure System

Figure 1A:
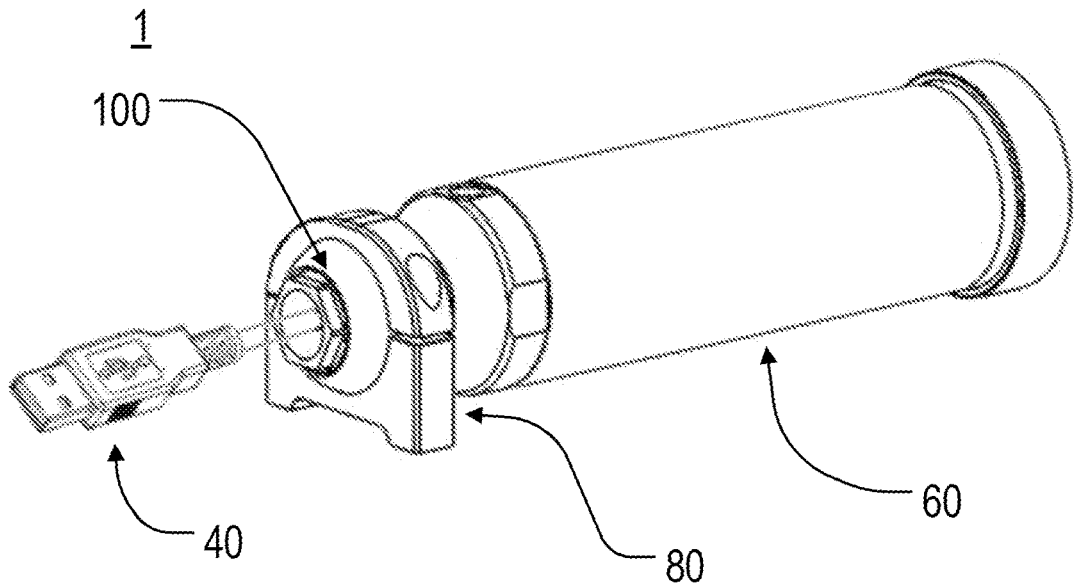
FIG. 1A is a front perspective view of a mounted enclosure system including a mount assembly, according to a first exemplary embodiment.
Figure 1B:
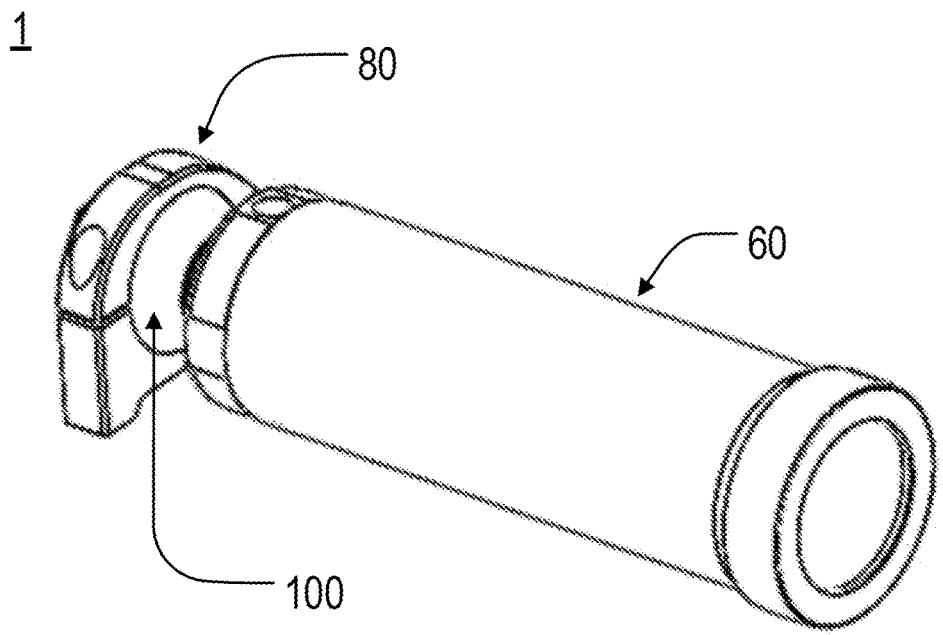

FIGS. 1A-1B show an exemplary embodiment of a mounted enclosure system 1 designed to provide maximum protection to electrical systems contained therein from harsh industrial environments without compromising the adjustability of the electrical system. The mounted enclosure system 1 may include a mount assembly 100 having a sealing device, such as a soft rubber, foam, or like device integrated therein, an enclosure 60, and a clamping mechanism 80. The enclosure 60 and the clamping mechanism 80 may be designed in a variety of different shapes and configurations, and it is to be understood that the present disclosure is not limited to exemplary embodiments depicted in FIGS. 1A and 1B.

According to one embodiment, the mount assembly 100 shown in FIGS. 1A-1B is designed to allow a cable and/or tube to pass therethrough. The cable and/or tube may be configured to provide an electrical signal and/or a fluid flow through the mount assembly 100. The mount assembly 100 may be configured to form a leak resistant connection with the enclosure 60 and to be supported by the clamping mechanism 80. The mount assembly 100 may also form a pressure seal between the mount assembly 100 and the enclosure 60. The enclosure 60 may be designed to accommodate electrical devices such as cameras, lighting, sensors, barcode readers, lasers, machine vision, security equipment, and the like. The clamping mechanism 80 may be designed to accommodate the mount assembly 100 through a variety of different mechanisms so long as the clamping mechanism 80 is configured to support the mount assembly 100. In one embodiment, the clamping mechanism 80 may be loosened and/or adjusted so that the mount assembly 100 may be adjusted relative to the clamping mechanism 80. As such, an angle position of the mount assembly 100, and the enclosure 60, may be adjusted relative to the clamping mechanism 80. The structure of the mount assembly 100, and the components thereof, are described in more detail below.

Overview of Mount Assembly

Figure 2:
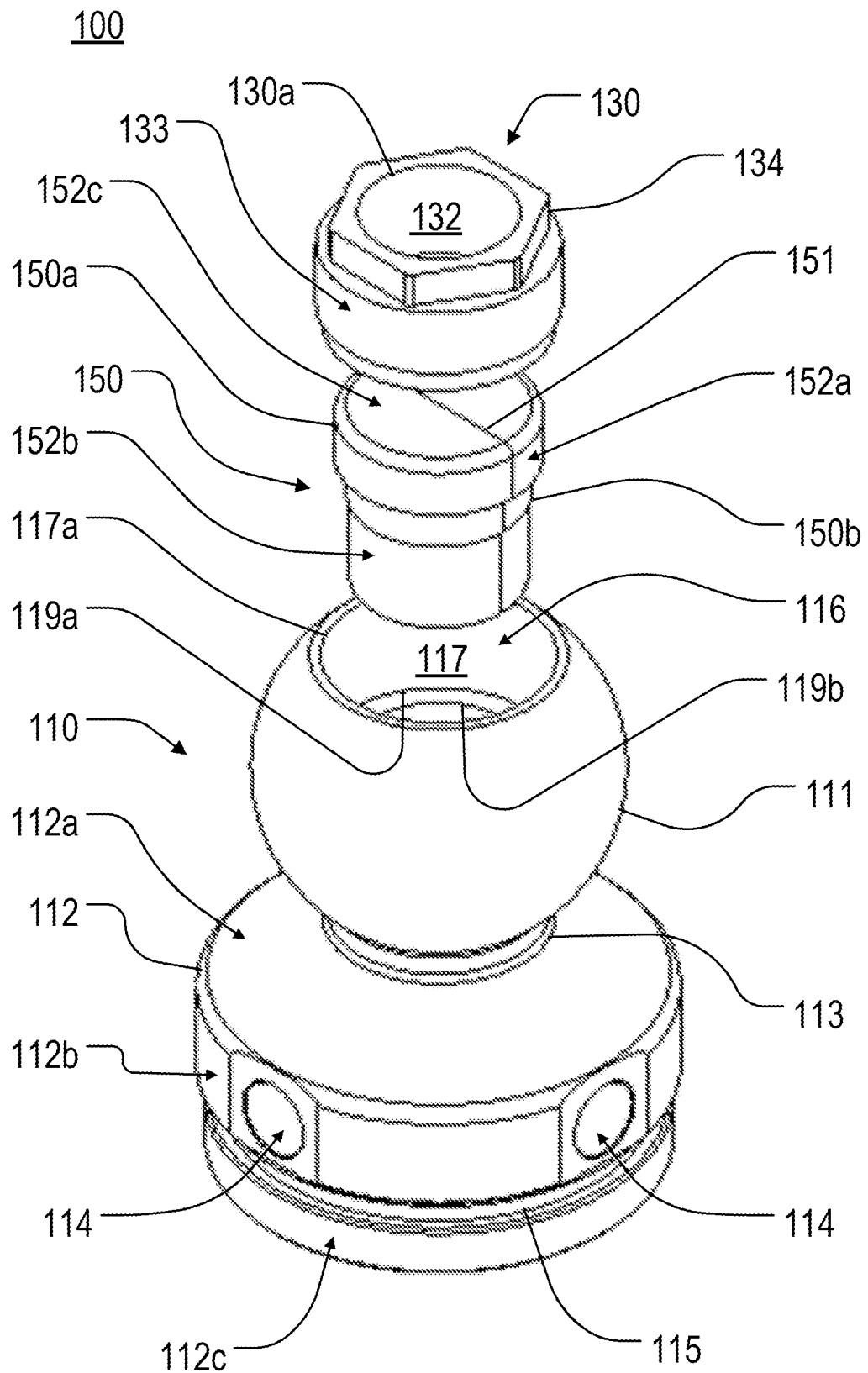
FIG. 2 is an exploded view of the mount assembly shown in FIG. 1A.
Figure 3A:
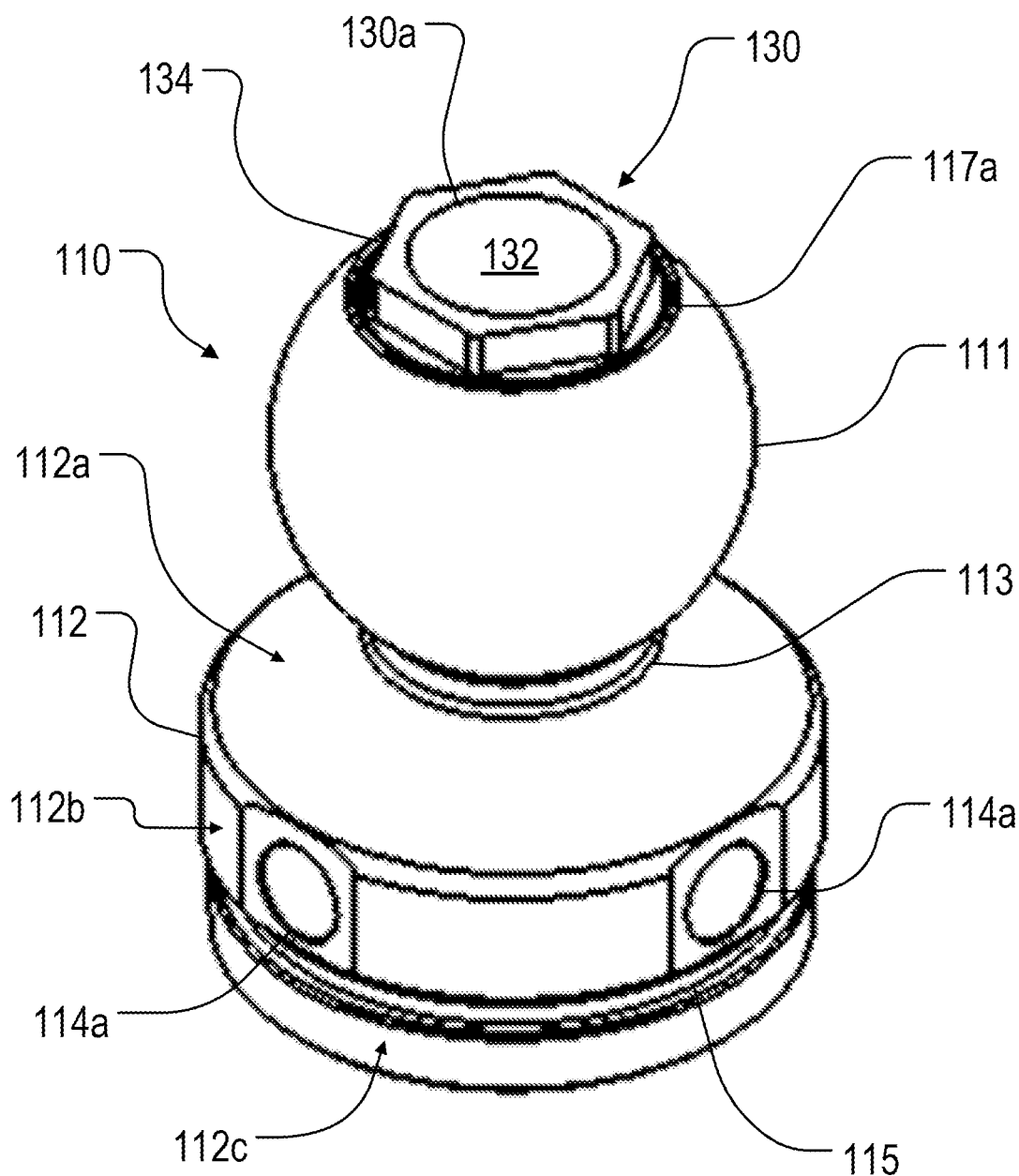
FIG. 3A is a perspective view of the mount assembly shown in FIG. 1A.
Figure 3B:
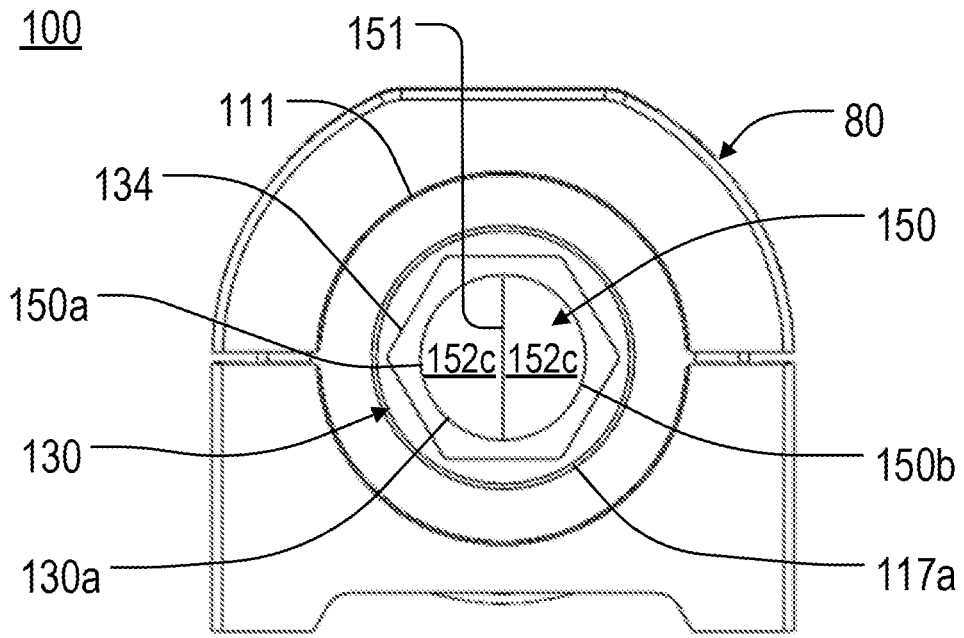
FIG. 3B is a side view of the mount assembly shown in FIG. 1A.
Figure 3C:
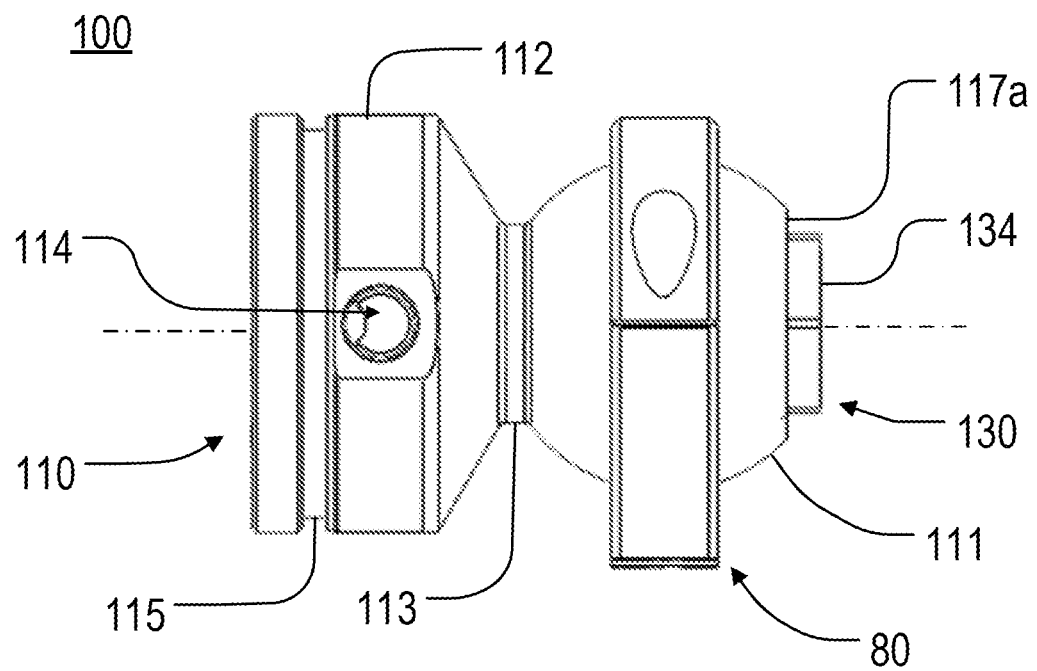
FIG. 3C is a front view of the mount assembly shown in FIG. 1A.
Figure 4A:
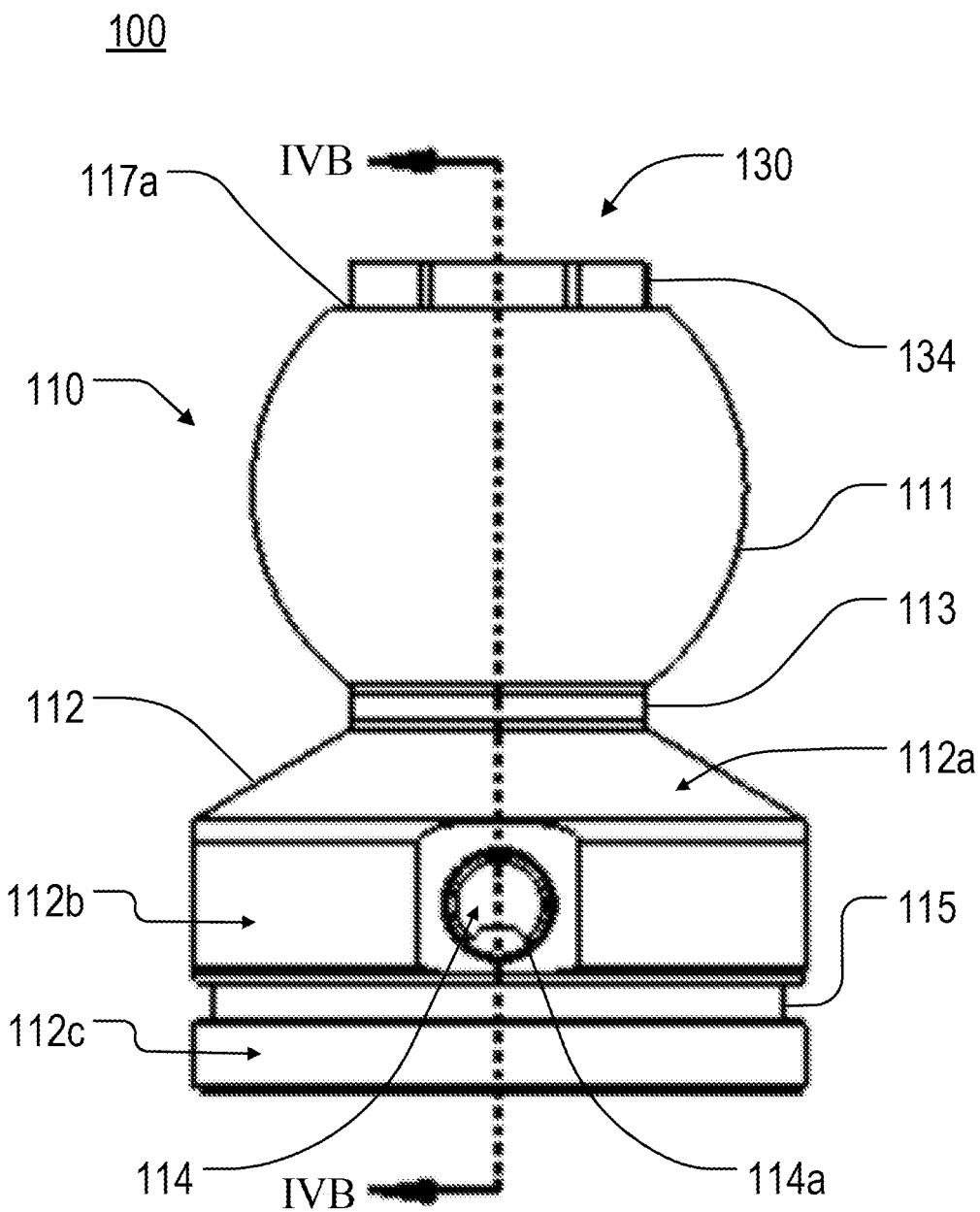
FIG. 4A is a side view of the mount assembly shown in FIG. 1A.
Figure 4B:
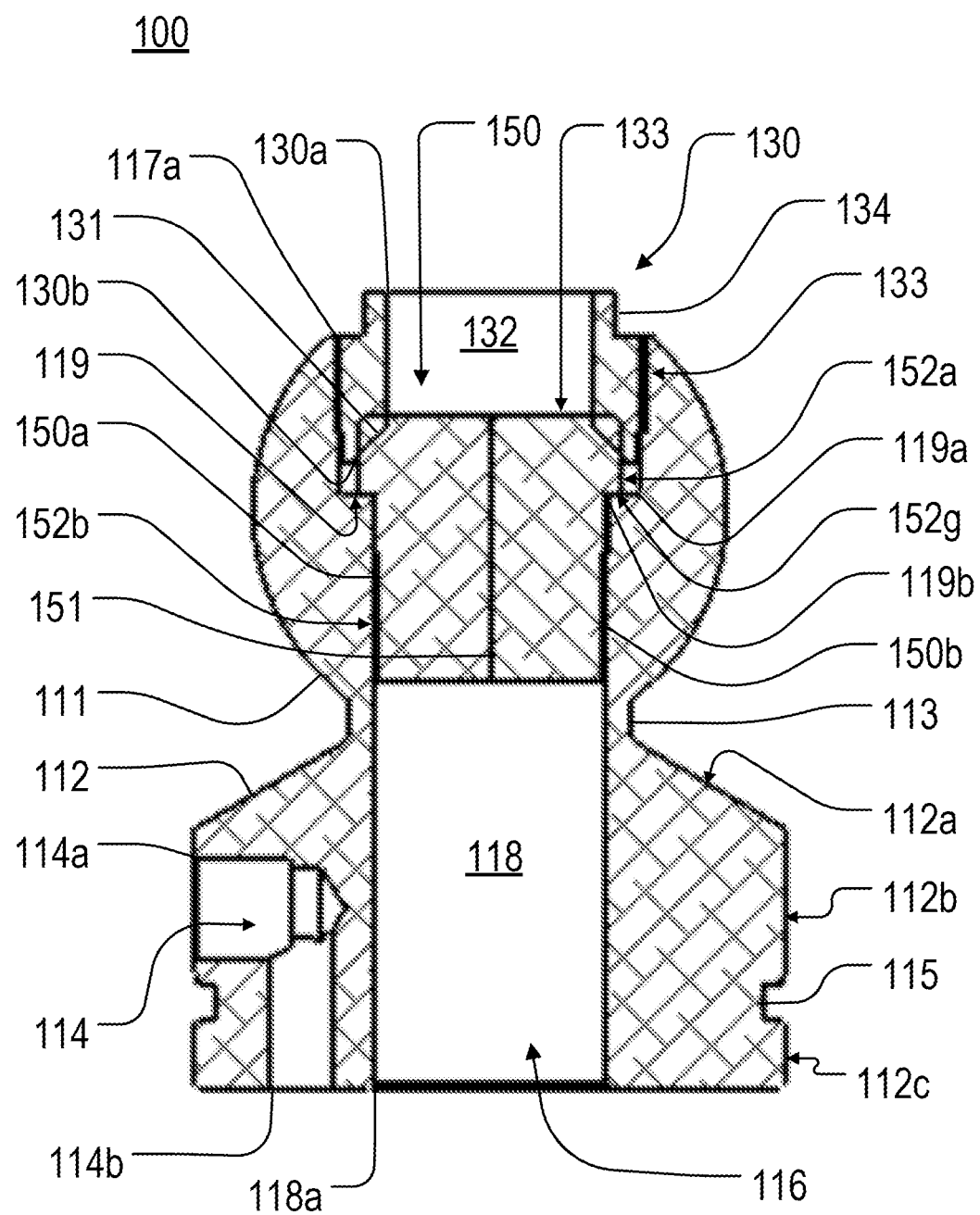
FIG. 4B is a side cross-sectional view of the mount assembly between lines IVB and IVB shown in FIG. 4A.
Figure 4C:
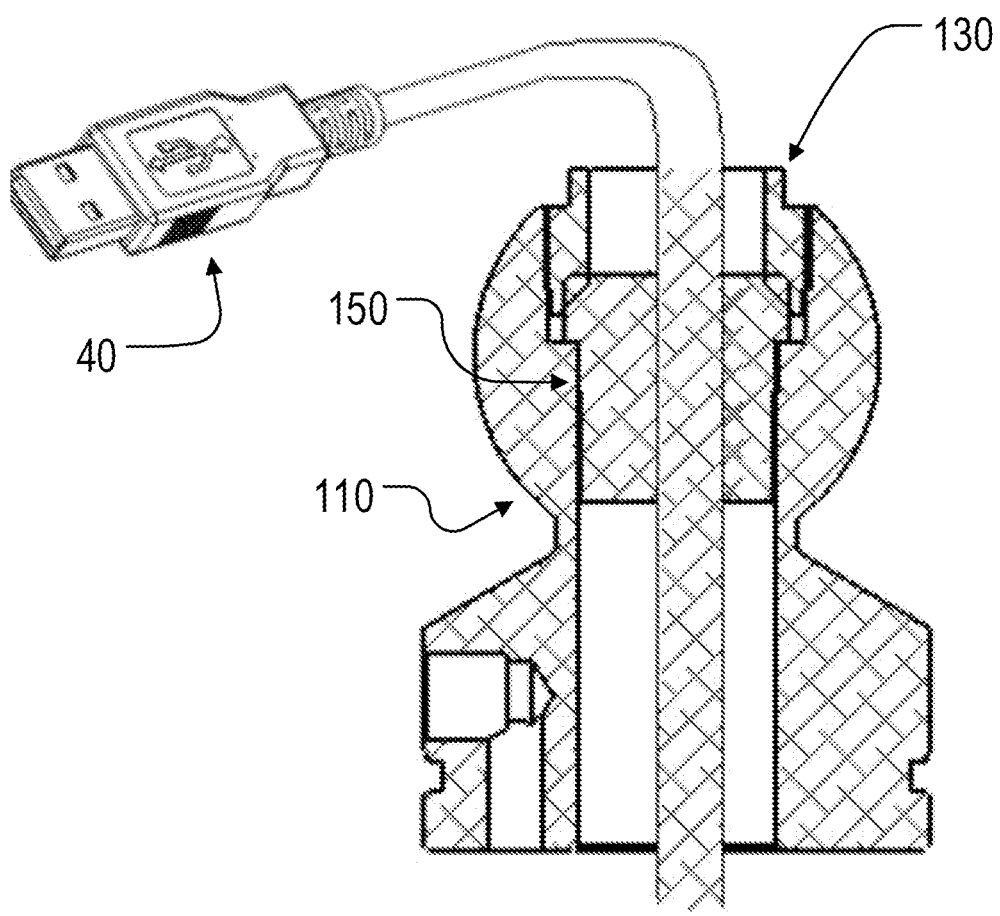
FIG. 4C is a side cross-sectional view of the mount assembly between lines IVB and IVB shown in FIG. 4A having a cable passing therethrough.

FIGS. 2-4C illustrate various views of the mount assembly 100 according to one exemplary embodiment. FIG. 2 shows an exploded view of the mount assembly 100 which may include a ball mount 110, a compression fitting 130, and a sealing insert 150. FIGS. 3A-4C show various assembled views of the mount assembly 100 depicting how the ball mount 110, the compression fitting 130, and the sealing insert 150 may fit together according to the exemplary embodiment. FIGS. 4B-4C show a side cross-sectional view of the mount assembly 100 between the lines IVB and IVB shown in FIG. 4A.

Figure 5A:
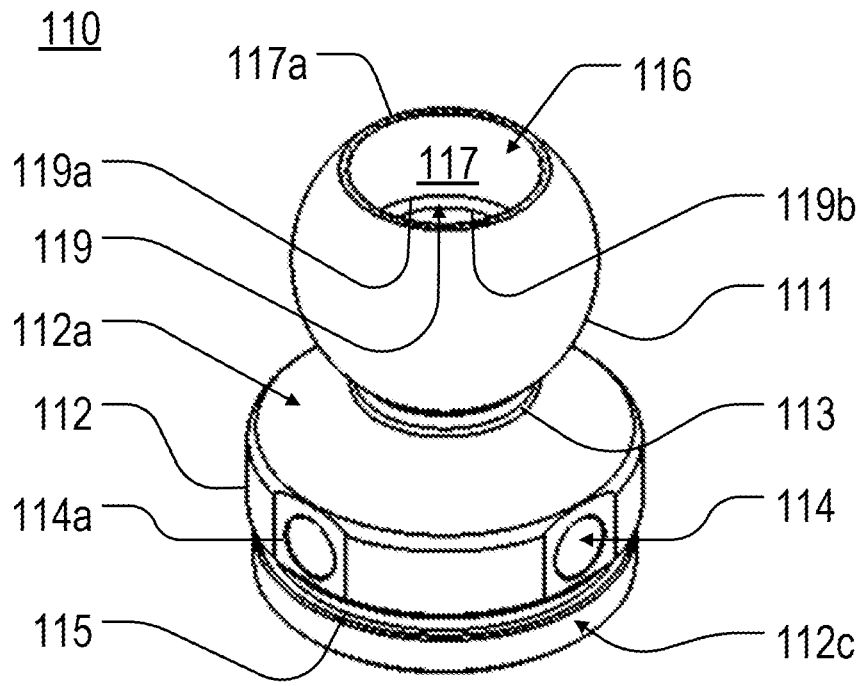
FIG. 5A is a perspective view of a ball mount according to an exemplary embodiment.
Figure 5B:
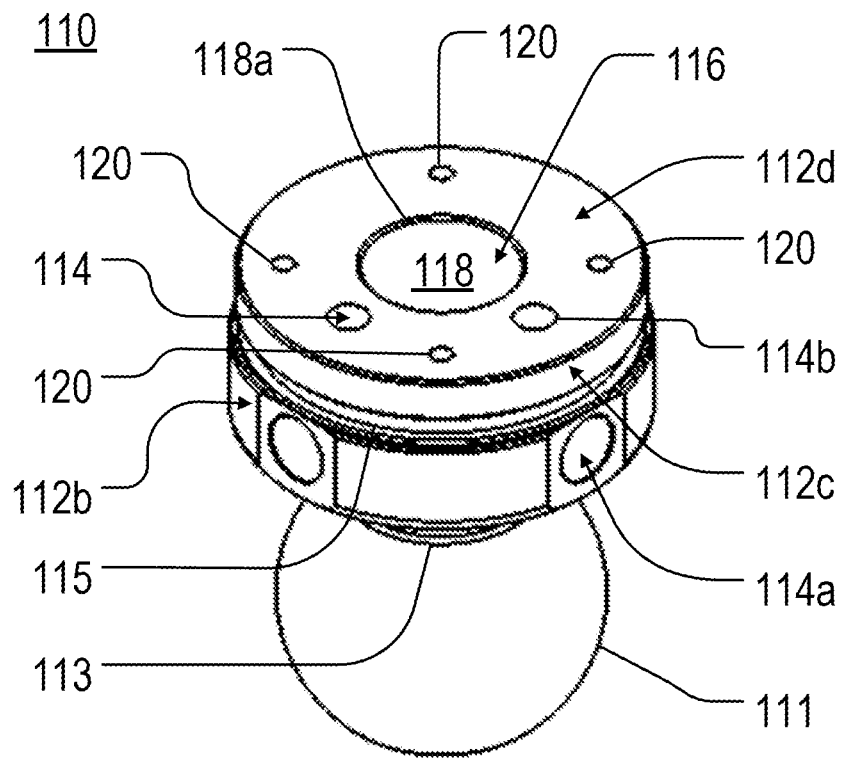
FIG. 5B is a bottom perspective view of the ball mount shown in FIG. 5A.
Figure 6A:
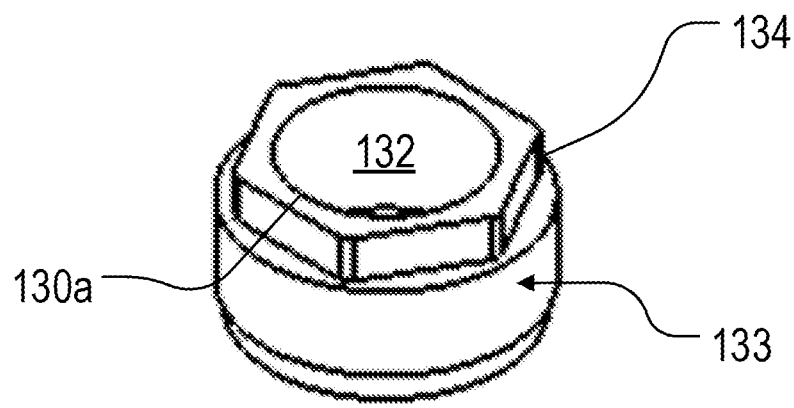
FIG. 6A is a perspective view of a compression fitting according to an exemplary embodiment.
Figure 6B:
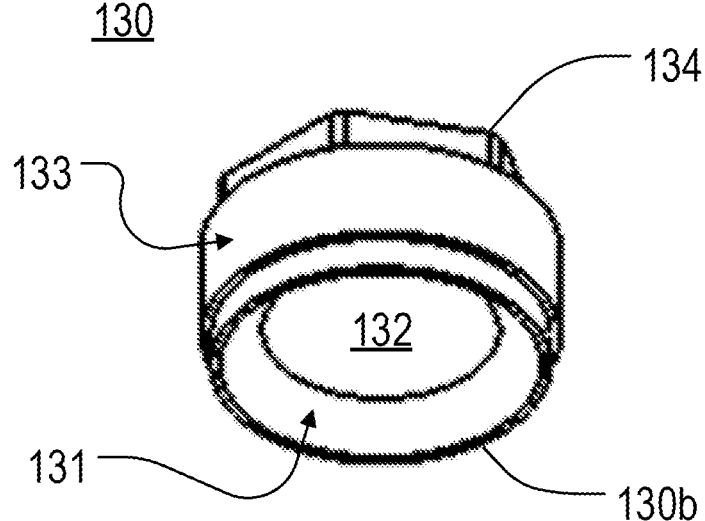
FIG. 6B is a bottom perspective view of the compression fitting shown in FIG. 6A.
Figure 6C:
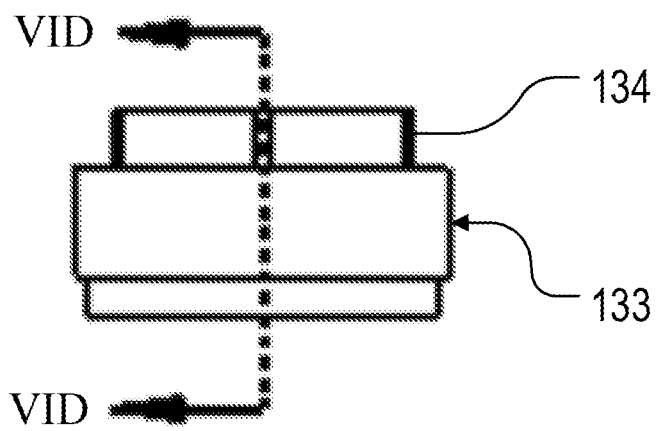
FIG. 6C is a front view of the compression fitting shown in FIG. 6A.
Figure 6D:
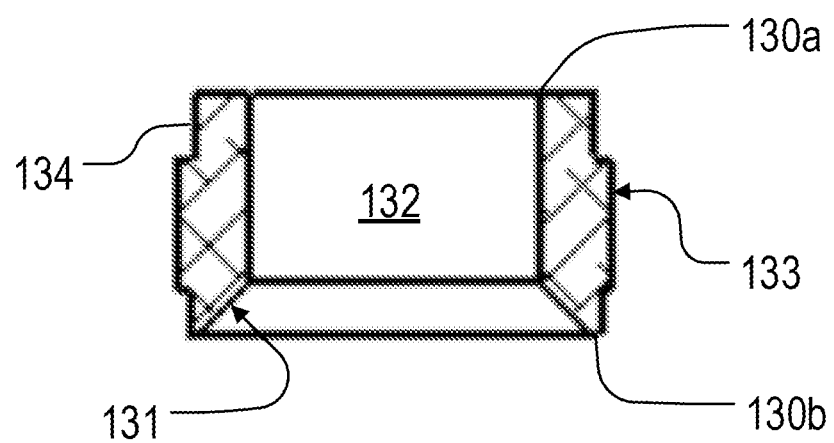
FIG. 6D is a side cross-sectional view of the compression fitting between lines VID and VID shown in FIG. 6C.
Figure 7:
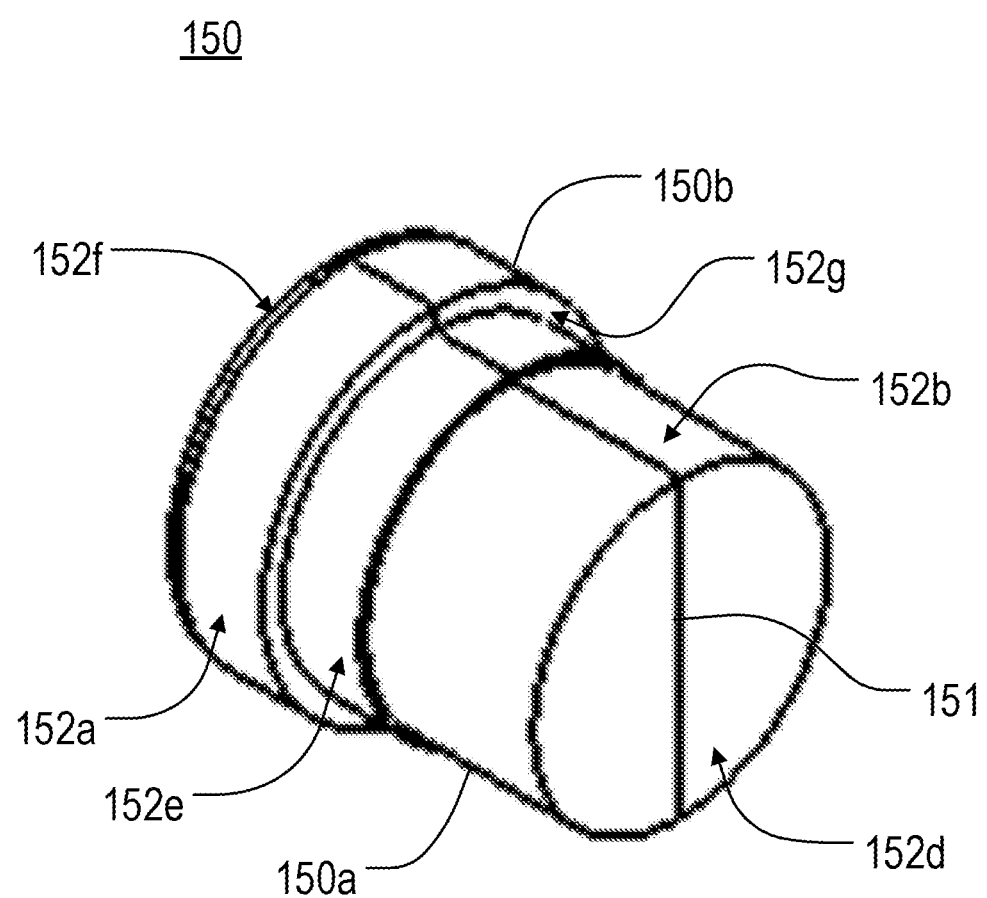
FIG. 7 is a perspective view of a sealing insert according to an exemplary embodiment.
Figure 8:
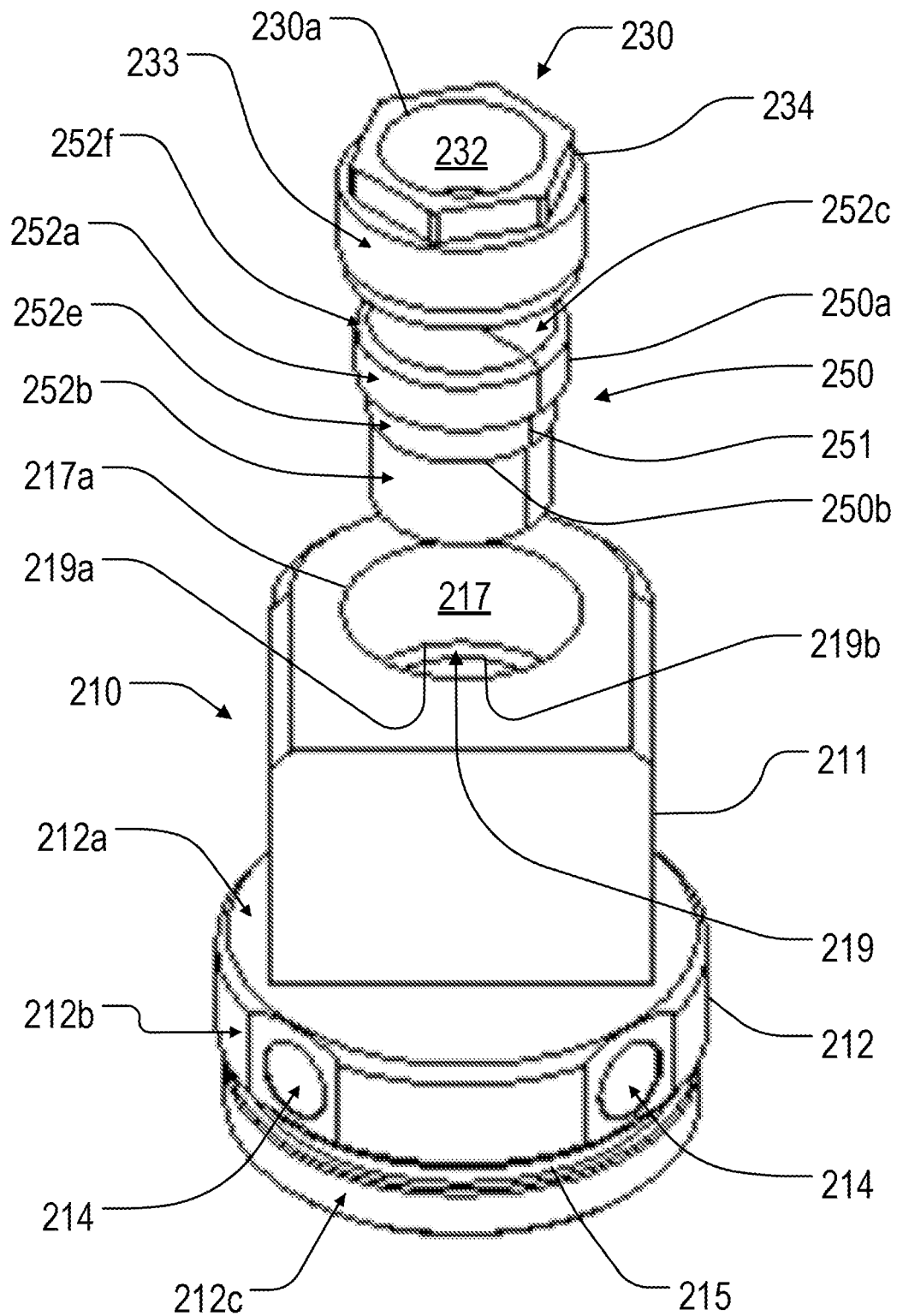
FIG. 8 is an exploded view of a mount assembly, according to a second exemplary embodiment.

The mount assembly 100 according to the exemplary embodiment shown in FIGS. 2-4C, when assembled, includes a ball mount 110 (shown in further detail in FIGS. 5A-5B), a compression fitting 130 (shown in further detail in FIGS. 6A-6D), and a sealing insert 150 (shown in further detail in FIG. 7). In this embodiment, the ball mount 110 includes a body portion 111 having an opening 117a and a base portion 112 having an opening 118a. The ball mount 110 further includes an internal passage 116 extending from the opening 117a of the body portion 111 in an axial direction of the ball mount 110. In one embodiment, the internal passage 116 is further configured to extend from the opening 117a to the opening 118a along the axial direction of the ball mount. The sealing insert 150 is configured to be inserted into the internal passage 116 of the ball mount 110 and secured in the internal passage 116 by the compression fitting 130. The compression fitting 130 is configured to be fit to the ball mount 110 such that the sealing insert 150 is securely interposed between the compression fitting 130 and the ball mount 110 in the internal passage 116. In a preferred embodiment, the ball mount 110, the compression fitting 130, and the sealing insert 150 are each configured to allow a cable 40 to pass therethrough.

The Mount

As described in more detail herein, the mount may be an adjustable mount, whether that adjustment be rotational, tilting, panning, or a combination thereof. In this embodiment, the adjustable mount is a ball mount 110 configured to swivel and having the body portion 111 and the base portion 112. The ball mount 110 includes the internal passage 116 extending from the opening 117a of the body portion 111 in the axial direction of the ball mount 110. The body portion 111 and the base portion 112 of the ball mount 110 may be coupled to each other at a neck 113. The ball mount 110 may be made of any suitable material, for example, aluminum, plastic, and stainless steel. The body portion 111 may be made of the same material as the base portion 112. Alternatively, ball mount 110 may be comprised of one or more different materials. The body portion 111 may be made of, and/or coated with, materials different than the base portion 112.

The body portion 111 of the ball mount 110 is configured to be substantially round in shape and to have the internal passage 116 formed therein at the opening 117a of the ball mount 110. In one embodiment, the opening 117a of the body portion 111 may be centrally located on the ball mount 110 about the center axis of the ball mount 110. The opening 117a is configured to allow a cable 40 to pass therethrough. The opening 117a is further configured to receive and support the sealing insert 150 in the internal passage 116 and thereby provide a seal on the inside of the internal passage 116. The opening 117a of the body portion 111 is also configured to receive the compression fitting 130. The outer surface 133 of the compression fitting 130 may be, but is not limited to being, coupled to the ball mount 110 via an interference fit, a threaded fit, a snap fit, a fit using an adhesive (e.g., glue), or any other type of fit. In one embodiment, at least a portion of the opening 117a of the body portion 111 is configured to align within an opening of the clamping mechanism 80. In an alternate embodiment, the opening 117a may be disposed within the enclosure 60.

The base portion 112 of the ball mount 110 may be configured to be coupled to, and/or integrated with, a device, apparatus, enclosure, mount, or the like. In one embodiment, the base portion 112, although not particularly limited to this configuration, includes a top surface 112a, and upper side surface 112b, a lower side surface 112c, and a bottom surface 112d. The top surface 112a is configured to be integral with the neck 113 coupling the body portion 111 and the base portion 112. The upper side surface 112b and/or the lower side surface 112c may include an input/output to at least one air channel 114. The at least one air channel 114 may contain a first air fitting port 114a as a threaded inlet and/or outlet. The lower side surface 112c may be, but is not limited to being, coupled to the enclosure 60 via an interference fit, a threaded fit, a snap fit, a fit using an adhesive (e.g., glue), or any other type of fit. The bottom surface 112d is configured to include the internal passage 116 extending from the opening 118a of the base portion 112 in the axial direction of the ball mount 110. The opening 118a is configured to allow a cable 40 to pass therethrough.

The base portion 112 of the ball mount 110 may further include a groove portion 115 for a sealing mechanism, such as an O-ring, capable of forming a seal between the ball mount 110 and the enclosure 60. In one embodiment, the groove portion 115 may be disposed between the upper side surface 112b and the lower side surface 112c of the ball mount 110 in order to provide an air tight seal between the upper side surface 112b and the bottom surface 112d. Preferably, the upper side surface 112b is configured to include the at least one air channel 114 having a first air fitting port 114a as an inlet and/or outlet and the bottom surface 112d is configured to include the at least one air channel 114 having a second air fitting port 114b as the other of an inlet and/or outlet. However, it is to be understood that the present disclosure is not particularly limited to this embodiment. For example, the first air fitting port 114a and the second air fitting port 114b may be configured to allow for a fluid flow in either direction and may be configured to receive any type of fluid and/or gas.

The base portion 112 of the ball mount 110 may further include at least one mounting hole 120. In one embodiment, the base portion 112 comprises a plurality of mounting holes 120 disposed radially around a periphery of the opening 118a of the base portion 112. The ball mount 110 may include mounting holes 120 in addition to, or instead of, a lower side surface 112c having a threaded portion.

Referring to FIGS. 4A-5B, the ball mount 110 includes the internal passage 116 extending through the body portion 111, the neck 113, and the base portion 112 in the axial direction of the ball mount 110. According to one embodiment, the internal passage 116 is configured to extend from the opening 117a of the body portion 111 to the opening 118a of the base portion 112. The internal passage 116 of the body portion 111 includes a first sidewall 117, a second sidewall 118, and a shoulder portion 119 disposed between the first sidewall 117 and the second sidewall 118. In one embodiment, the first sidewall 117, a portion of the second sidewall 118, and the shoulder portion 119 are located within the body portion 111 and a portion of the second sidewall 118 is located in the base portion 112. However, the position of the shoulder portion 119 within the internal passage 116 is not particularly limited to this embodiment. For example, at least a portion of the shoulder portion 119 may be located in the neck 113 and/or the base portion 112.

The first sidewall 117 and/or the second sidewall 118 are configured to be substantially cylindrical in shape. The first sidewall 117 and/or the second sidewall 118 may comprise a threaded wall disposed along a portion of, or along the entire, first sidewall 117 and/or the second sidewall 118. In one embodiment, the first sidewall 117 is preferably configured to have a threaded wall portion for fitting the outer surface 133 of the compression fitting 130 to the ball mount 110 for securing the sealing insert 150 within the internal passage 116. A force applied by the compression fitting 130 to the sealing insert 150 secures the sealing insert 150 to the internal passage 116 thereby providing a seal between the first sidewall 117 and the second sidewall 118.

The shoulder portion 119 of the internal passage 116 includes an outer edge 119a having a first diameter measured in the radial direction from the center axis and an inner edge 119b having a second diameter measured in the radial direction from the center axis. In one embodiment, the shoulder portion 119 is configured to meet with the first sidewall 117 at an interface defined by the outer edge 119a and to meet with the second sidewall 118 at an interface defined by the inner edge 119b. In one embodiment, the outer edge 119a and the inner edge 119b are substantially circular in shape and are formed concentric with one another such that the first diameter is greater than the second diameter. In an alternate embodiment, the outer edge 119a and the inner edge 119b may not share a common center.

The outer edge 119a and the inner edge 119b may both be formed in a plane intersecting the center axis such that the shoulder portion 119 is formed substantially perpendicular to the first sidewall 117 and/or the second sidewall 118. In another embodiment, the outer edge 119a may be formed on a side of the ball mount 110 closer in an axial direction to the opening 117a of the body portion 111 than the inner edge 119b such that the shoulder portion 119 is configured to be inclined in a downward direction toward the opening 118a. In yet another embodiment, the outer edge 119a may be formed on a side of the ball mount 110 closer in an axial direction to the opening 118a of the base portion 112 than the inner edge 119b such that the shoulder portion 119 is configured to be inclined in a upward direction toward the opening 117a.

The diameter of the opening 117a of the body portion 111 may be substantially similar to the first diameter of the outer edge 119a. The diameter of the opening 118a of the base portion 112 may be substantially similar to the second diameter of the inner edge 119b. In another embodiment, the diameter of the opening 117a of the body portion 111 may be larger than the first diameter of the outer edge 119a. In another embodiment, the diameter of the opening 118a of the base portion 112 may be larger than the second diameter of the inner edge 119b. In yet another embodiment, the diameter of the opening 117a of the body portion 111 may be smaller than the first diameter of the outer edge 119a. In yet another embodiment, the diameter of the opening 118a of the base portion 112 may be smaller than the second diameter of the inner edge 119b.

Figure 9:
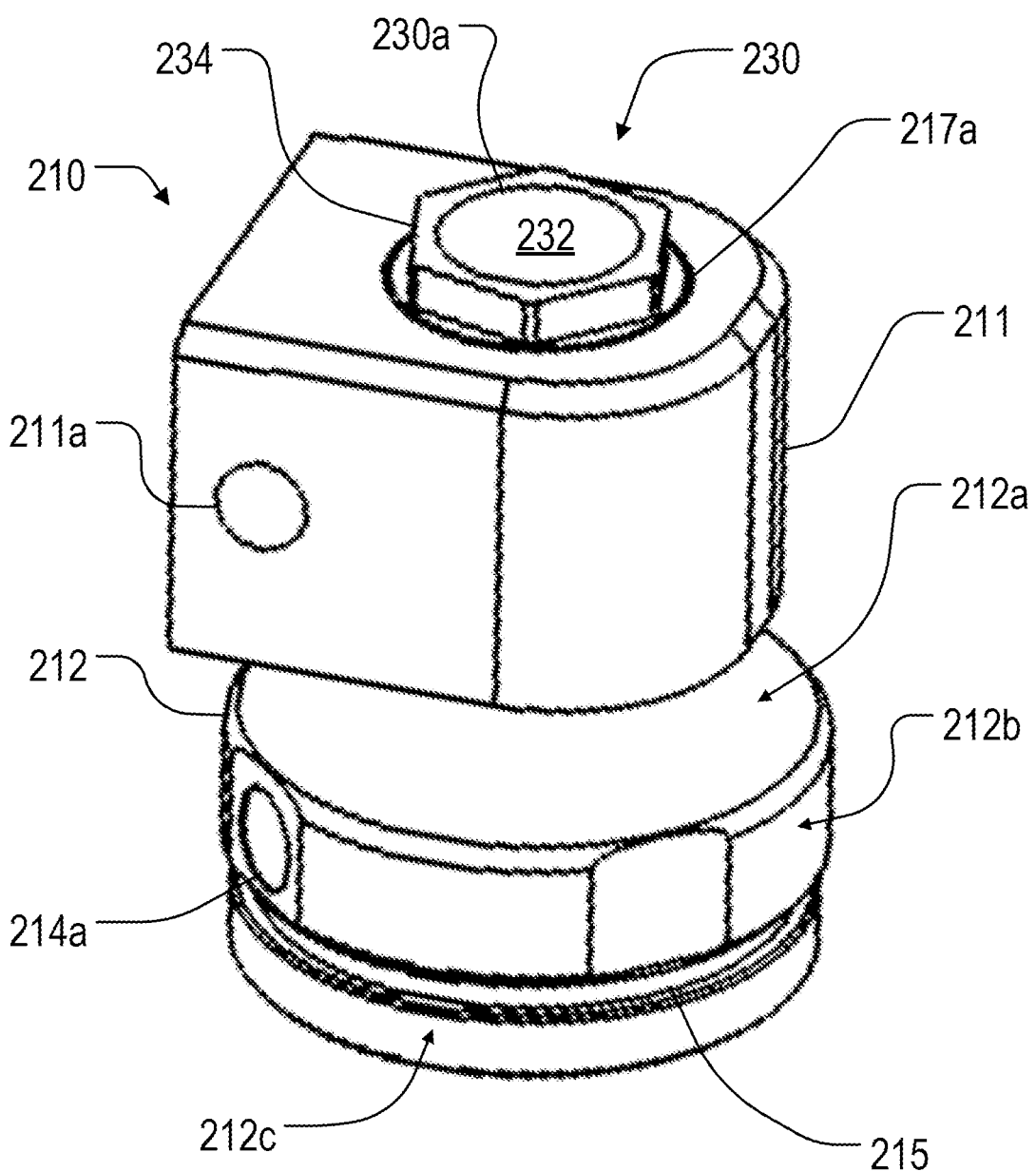
FIG. 9 is a perspective view of the mount assembly shown in FIG. 8.
Figure 10A:
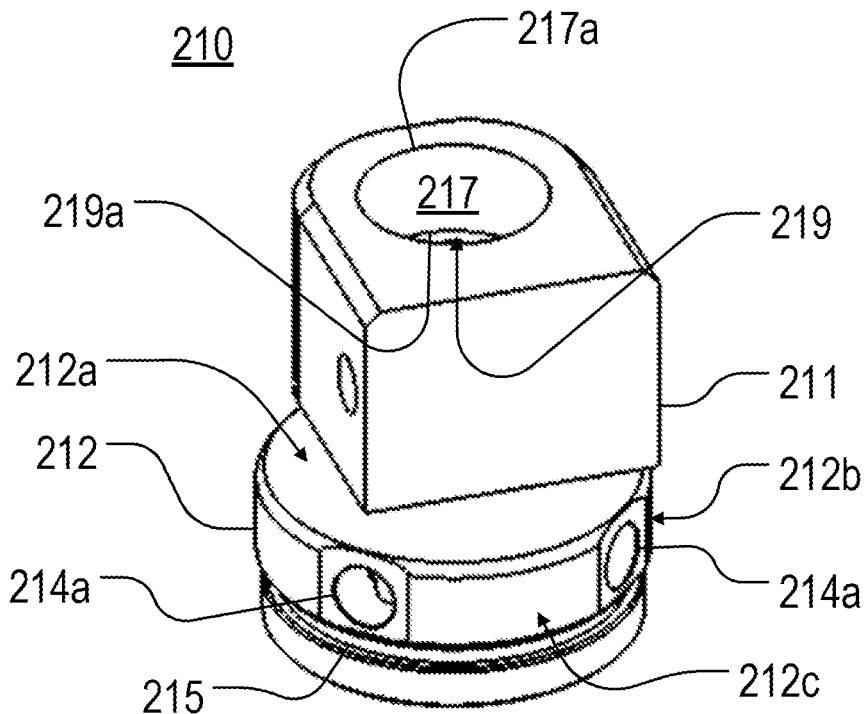
FIG. 10A is a perspective view of a tilt mount according to an exemplary embodiment.
Figure 10B:
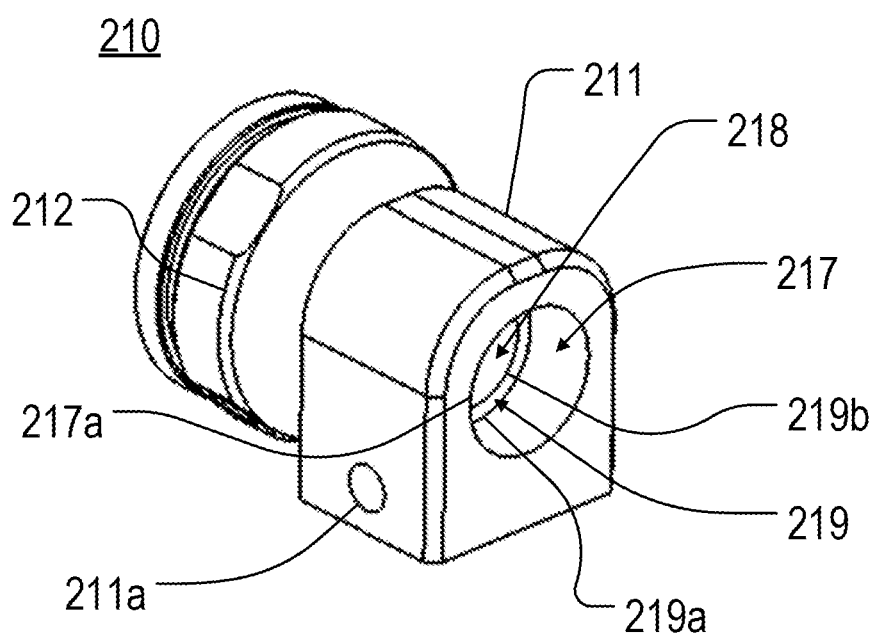
FIG. 10B is a side perspective view of the tilt mount shown in FIG. 10A.

Referring now to FIGS. 8-10B, another alternative embodiment of a mount assembly 200 is shown. The alternative embodiment of the mount assembly 200 shown in FIGS. 8-10B is similar to the embodiment of the mount assembly 100 shown in FIGS. 1A-7 and described above except for the differences described herein. As shown in FIG. 9, the mount assembly 200 includes a tilt mount 210 comprising a body portion 211 and a base portion. The body portion 211 comprises a through hole 211a configured to be pivotally attached to an external mount or support. In one embodiment, the mount assembly 200 may be adjusted about an axis extending through the through hole 211a such that an angle position of the mount assembly 200, and the enclosure 60 mountable thereon, may be adjusted. While FIGS. 8-10B illustrate that the mount assembly 200 may be tilted about the axis extending through the through hole 211a, the mount assembly 200 may be configured to be adjusted (i.e., rotate, tilt, pan, or a combination thereof) about any axis relative to the mount assembly 200 and/or a mounting device for the same.

Figure 11A:
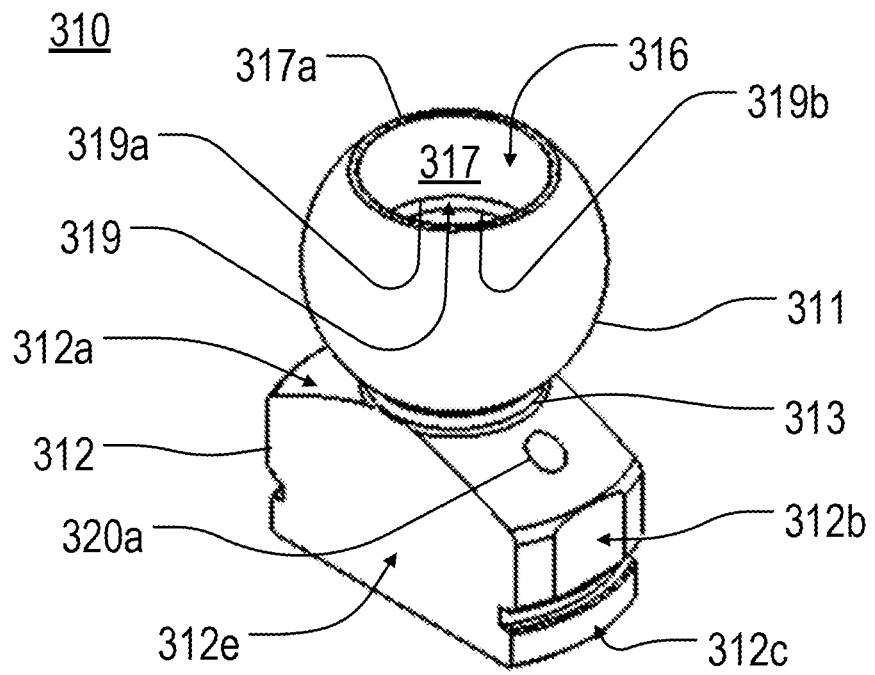
FIG. 11A is a perspective view of a ball mount according to another exemplary embodiment.
Figure 11B:
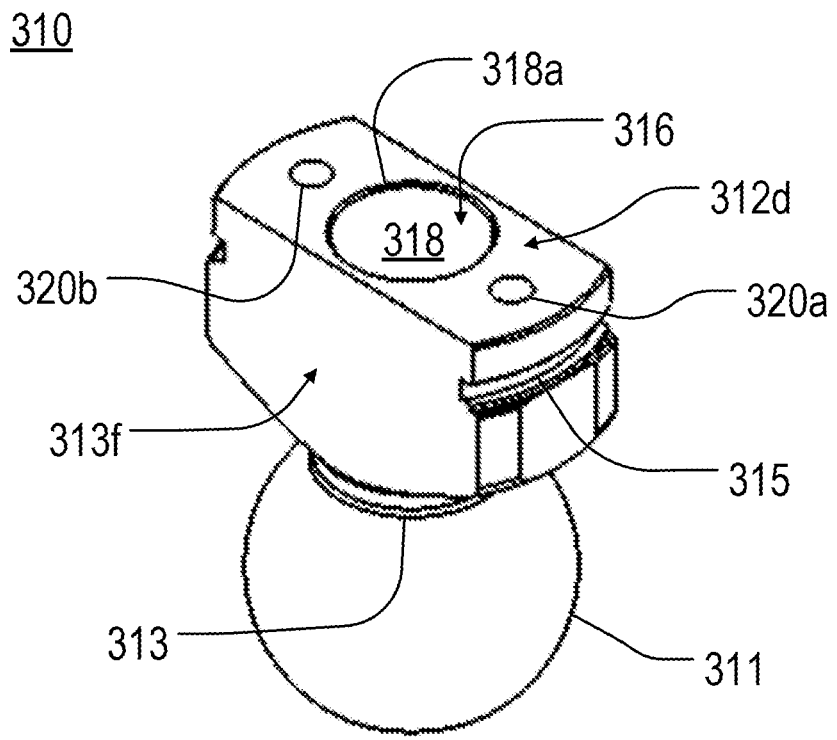
FIG. 11B is a side perspective view of the ball mount shown in FIG. 11A.

Referring now to FIGS. 11A-11B, another alternative embodiment of a ball mount 310 is shown. The alternative embodiment of the ball mount 310 shown in FIGS. 11A-11B is similar to the embodiment of the ball mount 110 shown in FIGS. 1A-5B, the tilt mount 210 shown in FIGS. 8-10B, and described above except for the differences described herein. As shown in FIGS. 11A-11B, a modified ball mount 310 includes a body portion 311 and a base portion 312. The base portion 312 may include a top surface 312a, and upper side surface 312b, a lower side surface 312c, a bottom surface 312d, a first side surface 312e, and a second side surface 312f.

The top surface 312a is configured to be integral with a neck 313 coupling the body portion 311 and the base portion 312. In one embodiment, the bottom surface 312d may be, but is not limited to being, coupled to the enclosure 60 by mounting holes 320a and 320b which may be configured to receive a fastener from the top surface 312a. In an alternative embodiment, the base portion 312 may be coupled to the enclosure 60 by the upper surface 312b and/or the lower side surface 312c which may be threaded. The bottom surface 312d is configured to include an internal passage 316 extending from an opening 318a of the base portion 312 in the axial direction of the modified ball mount 310 to an opening 317a of the body portion 311. The opening 318a and the opening 317a are configured to allow a cable 40 to pass therethrough.

The Compression Fitting

The compression fitting can be the same as those described above. As described in more detail herein, the compression fitting 130 is configured to secure the sealing insert 150 in the internal passage 116 of the ball mount 110. As shown in FIGS. 6A-6D, the compression fitting 130 includes an exterior opening 130a located on a distal end side of the compression fitting 130 relative to the sealing insert 150 in the axial direction, an interior opening 130b located on a proximal end side of the compression fitting 130 relative to the sealing insert 150 in the axial direction, an inner surface 132, and an outer surface 133. As described above, the outer surface 133 may comprise a threaded portion configured to pair with the internal passage 116 of the ball mount 110 such that at least a portion of the outer surface 133 of the compression fitting 130 is fastened to at least a portion of the first sidewall 117 of the ball mount 110.

In one embodiment, the compression fitting 130 may be a tapered sealing nut having a head 134. The compression fitting is configured to fit within the opening 117a of the body portion 111 such that at least a portion of the head 134 extends above the opening 117a to allow the compression fitting 130 to be tightened. In one embodiment, the compression fitting 130 may be tightened such that the entire compression fitting 130 is disposed within the internal passage 116 and below the opening 117a. The compression fitting 130 is further configured to allow a cable 40 to pass through each of the ball mount 110, the compression fitting 130, and the sealing insert 150.

Referring to FIGS. 6C-6D, the inner surface 132 of the compression fitting 130 is configured to include a chamfered portion 131 as shown in the cross-sectional view of the compression fitting 130 depicted in FIG. 6D. When the chamfered portion 131 is compressed and pressed against the sealing insert 150 at least one seal is formed between a portion of a volume defined by the first sidewall 117 and a portion of a volume defined by the second sidewall 118. The seal formed between internal passage 116 and the compression fitting 130 may be a liquid-tight seal and/or an air-tight seal.

Referring back to FIGS. 4B-4C, the compression fitting 130 is configured to be adjustably, removably, and/or permanently disposed in the opening 117a of the body portion 111 and to be coupled with the first sidewall 117 of the ball mount 110 such that the sealing insert 150 is securely interposed between the compression fitting 130 and the ball mount 110 in the internal passage 116. In one embodiment, the chamfered portion 131 of the compression fitting 130 is configured to apply a compressive force in the axial direction toward the sealing insert 150 to secure the sealing insert 150 and a compressive force inward in the radial direction to create a first seal between the sealing insert 150 and an object (e.g., the cable 40) passing through the sealing insert 150. Both compressive forces applied to the sealing insert 150 establish a second seal between the sealing insert 150 and the first sidewall 117, the second sidewall 118, and/or the shoulder portion 119. Additionally, a third seal is formed between the sealing insert 150 and compression fitting 130.

In one embodiment, the chamfered portion 131 of the compression fitting 130 is configured to contact the sealing insert 150 at a first distance from a center axis of the ball mount 110 in a direction orthogonal to the center axis. The inner edge 119b of the shoulder portion 119 is located at a second distance from the center axis of the ball mount 110 in the orthogonal direction, and the first distance is greater than the second distance. The outer edge 119a of the shoulder portion 119 is located at a third distance from the center axis of the ball mount 110 in the orthogonal direction, and the first distance is less than the third distance.

While FIGS. 6A-6D illustrate that the compression fitting 130 may be a tapered sealing nut, those skilled in the art will appreciate from this disclosure that various other known industrial or liquid tight fittings may also be employed. Additionally, while FIGS. 6A-6D illustrate that the compression fitting 130 may include a chamfered portion 131 configured to compress the sealing insert 150 against the shoulder portion 119 of the internal passage 116, the chamfer may occur on the compression fitting 130 and/or the shoulder portion 119. The chamfered portion 131 between the inner surface 132 and the outer surface 133 may alternatively comprise a beveled surface, a filleted surface, or a straight surface so as to form right angles between the inner surface 132 and the outer surface 133. The shoulder portion 119 may alternatively comprise a chamfered surface, a beveled surface, a filleted surface, or a straight surface so as to form a right angle(s) between the first sidewall 117 and the second sidewall 118. The compression fitting 130 is made of any suitable material, for example, aluminum, plastic, and stainless steel.

Figure 15A:
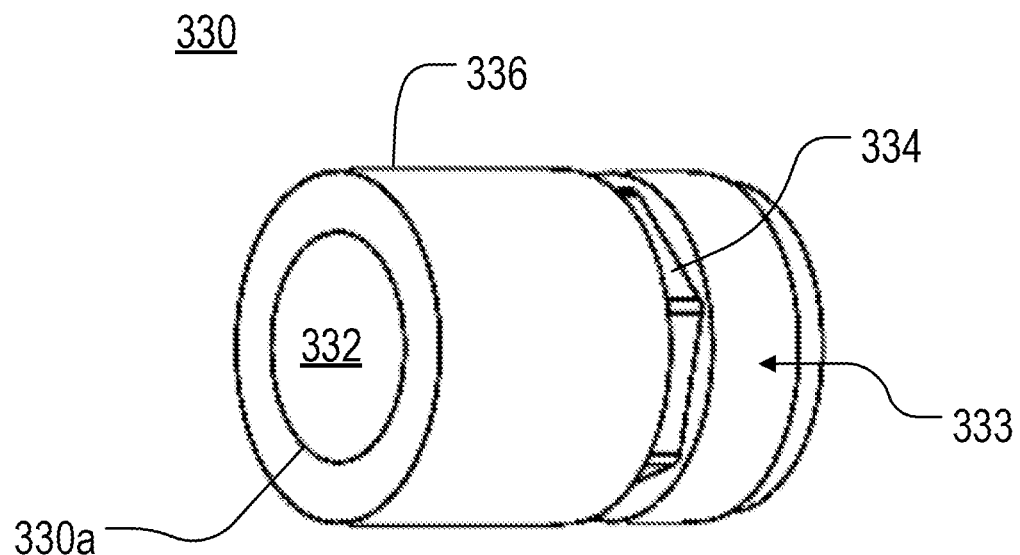
FIG. 15A is a perspective view of a compression fitting according to another exemplary embodiment.
Figure 15B:
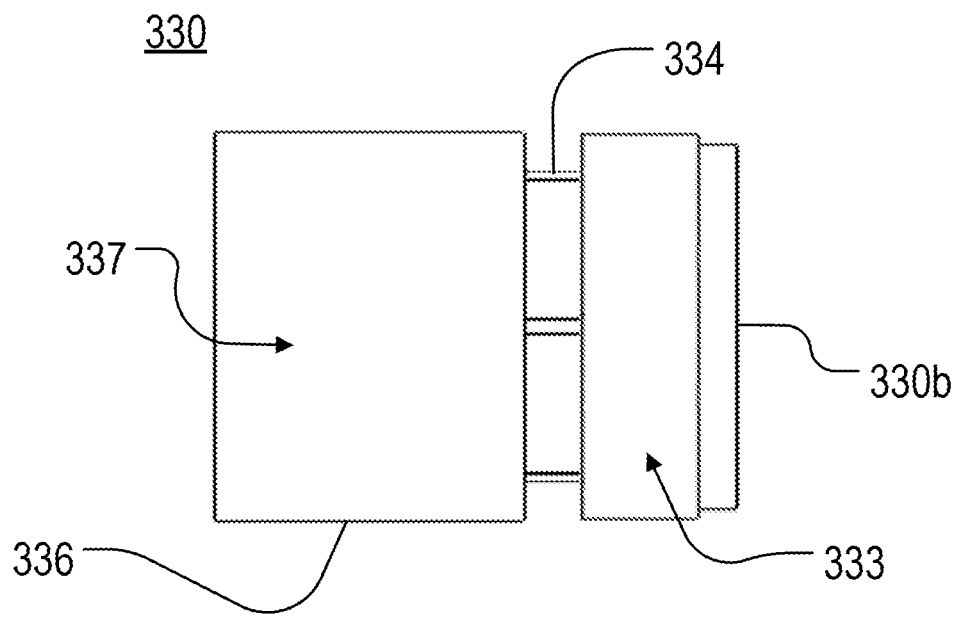
FIG. 15B is a side view of the compression fitting shown in FIG. 15A.

According to one alternative embodiment, the mount assembly 100 may include the compression fitting 330 depicted in FIGS. 15A-15B. The compression fitting 330 is similar to the embodiment of the compression fitting 130 described above except for the differences described below. The compression fitting 330 may be configured to secure the sealing insert 150 in the internal passage 116 of the ball mount 110. The compression fitting 330 includes an exterior opening 330*a* located on a distal end side of the compression fitting 330 relative to the sealing insert 150 in the axial direction, an interior opening 330*b* located on a proximal end side of the compression fitting 330 relative to the sealing insert 150 in the axial direction, an inner surface 332, a first outer surface 333, and a second outer surface 337. The length of the second outer surface 337 is preferably at least twice the length of the first outer surface 333.

The second outer surface 337 may be formed on an extended portion 336 of the compression fitting 330 in order to allow a conduit or tubing to be connected to the extended portion 336. The extended portion 336 is substantially tubular in shape. The second outer surface 337 of the compression fitting 330 may comprise a threaded portion configured to be connected to conduit or tubing for the cable 40. The first outer surface 333 may comprise a threaded portion configured to pair with the internal passage 116 of the ball mount 110 such that at least a portion of the outer surface 333 of the compression fitting 330 is fastened to at least a portion of the first sidewall 117 of the ball mount 110.

The Sealing Insert

As described in more detail herein, the sealing insert 150 is configured to be inserted into the internal passage 116 of the ball mount 110 and secured in the internal passage 116 by the compression fitting 130 thereby forming a leak resistant seal. Specifically, the sealing insert 150 is configured to provide a water-tight and/or air-tight seal between a portion of the volume defined by the first sidewall 117 and a portion of the volume defined by the second sidewall 118. The sealing insert 150 may be disposed entirely within the body portion 111 of the ball mount 110. Alternatively, the sealing insert 150 may be disposed partly within the body portion 111 and partly within the base portion 112. The sealing insert 150 can be the same as those described above. The sealing insert 150 may be a cord grip, a cable gland, or like mechanism configured to allow cables, tubes, wires, and the like to pass therethrough. The sealing insert 150 may be made of any suitable material, such as a soft piece of material like rubber, foam, or like material.

In one embodiment, the sealing insert 150 may be a split insert including a first sealing part 150*a* and a second sealing part 150*b* having a slit portion 151 formed between the first sealing part 150*a* and the second sealing part 150*b*. The first sealing part 150*a* and the second sealing part 150*b* are configured to allow a cable 40 to pass therethrough and to provide a water-tight and/or air-tight seal on the cable 40 along the slit portion 151. One technical effect of the sealing insert having the first sealing part 150*a* and the second sealing part 150*b* is that the sealing insert 150 may be formed around a cable 40 having a large connector 41.

The sealing insert 150 may comprise a substantially cylindrical shape. Alternatively, the sealing insert 150 may comprise a major surface 152*a*, a minor surface 152*b*, a top surface 152*c* and a bottom surface 152*d*; the major surface 152*a* having a diameter greater than the minor surface 152*b*. The sealing insert 150 may further include a middle surface 152*e* disposed between the major surface 152*a* and the minor surface 152*b* such that the middle surface 152*e* and the major surface are connected by a middle shoulder 152*g*. The top surface of the sealing insert 150 may have an edge 152*f* that is substantially radiused. Alternatively, the edge 152*f* may be chamfered, beveled, filleted, or straight so as to form a right angle.

Referring back to FIGS. 4B-4C, the sealing insert 150 is configured such that the major surface 152*a* and/or the top surface 152*c* may form a water-tight and/or air-tight seal with the compression fitting 130. In a preferred embodiment, the major surface 152*a* and/or the top surface 152*c* are configured to form a seal with the chamfered portion 131. In a more preferable embodiment, the edge 152*f* is configured to form a seal with the chamfered portion 131. Additionally, the sealing insert 150 is configured such that the middle shoulder 152*g* is configured to form a seal with the shoulder portion 119 of the ball mount 110. The major surface 152*a* may have a diameter smaller than the first diameter defined by the outer edge 119*a* of the shoulder such that an annular void is formed within a space defined by the ball mount 110, the compression fitting 130, and the sealing insert 150. In one embodiment, the entire middle shoulder 152*g* may be disposed on the shoulder portion 119.

In one embodiment the sealing insert 150 may be configured such that the middle surface 152*e* and the minor surface 152*b* form a water-tight and/or air-tight seal with the second sidewall 118. The top surface 152*c* and the inner surface 132 of the compression fitting 130 may define a first cavity disposed at least in part in the body portion 111. The bottom surface 152*d* and the volume formed within the second sidewall 118 may define a second cavity disposed at least in part in the base portion 112.

In one embodiment the sealing insert 150 may be configured such that the slit portion is disposed along the axial direction of the mount assembly 100. As such, a cable 40 may pass from the first cavity to the second cavity and through each of the ball mount 110, the compression fitting 130, and the sealing insert 150. The compression fitting 130 and the sealing insert 150 may both be configured to be attachable to, and removable from, the ball mount 110. In an alternate embodiment, the compression fitting 130 and the sealing insert 150 may be integrally formed as a singular component. However, it is to be understood that the present disclosure is not particularly limited to this embodiment.

Figure 12A:
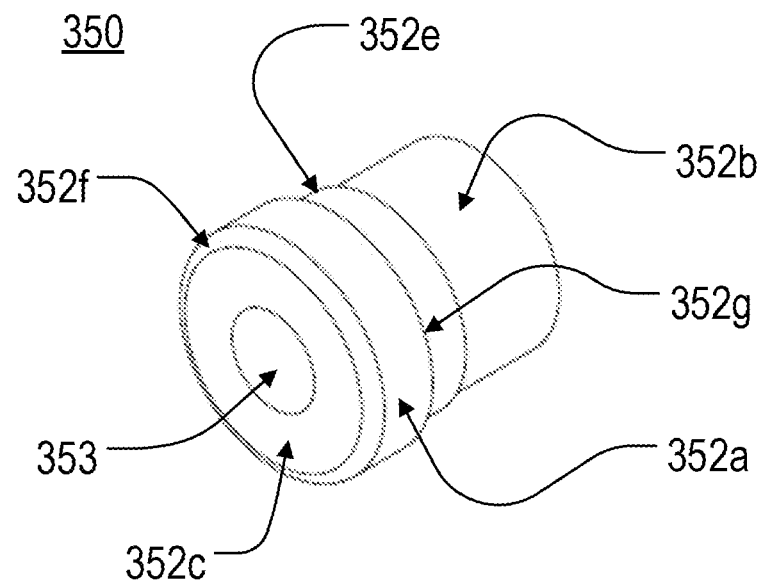
FIG. 12A is a perspective view of a sealing insert according to another exemplary embodiment.
Figure 12B:
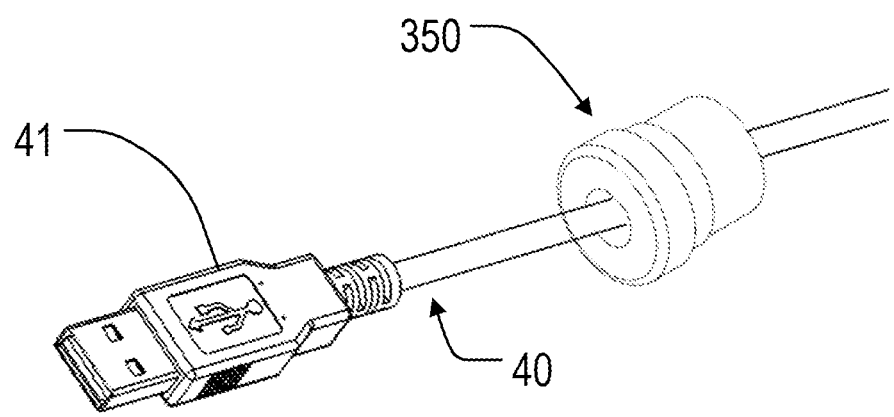
FIG. 12B is a perspective view of the sealing insert shown in FIG. 12A with a cable passing through the sealing insert.

According to one alternative embodiment, the mount assembly 100 may include the sealing insert 350 depicted in FIGS. 12A-12B. The sealing insert 350 is similar to the embodiment of the sealing insert 150 described above except for the differences described herein. The sealing insert 350 is configured to be a solid body having a cable hole 353 extending therethrough from a top surface 352*c* to a bottom surface of the sealing insert 350.

The sealing insert 350 is configured such that the major surface 352*a* and/or the top surface 352*c* may form a water-tight and/or air-tight seal with the compression fitting 130. In a preferred embodiment, the major surface 352*a* and/or the top surface 352*c* are configured to form a seal with the chamfered portion 131. In a more preferable embodiment, an edge 352*f* is configured to form a seal with the chamfered portion 131. Additionally, the sealing insert 350 is configured such that the middle shoulder 352*g* is configured to form a seal with the shoulder portion 119 of the ball mount 110.

Figure 13:
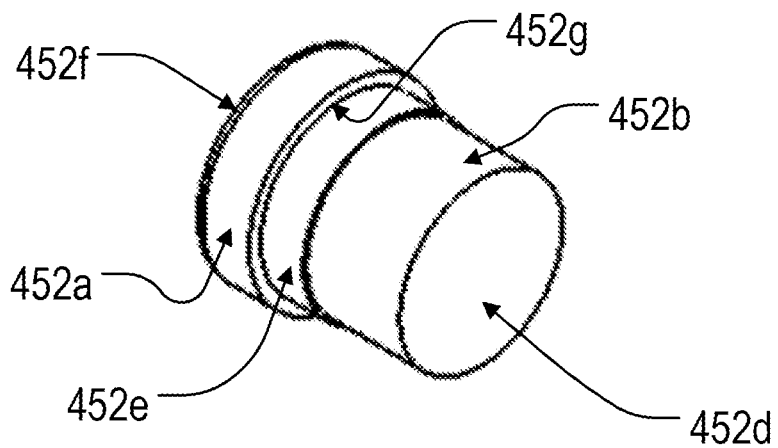
FIG. 13 is a perspective view of a sealing insert according to yet another exemplary embodiment.

According to one alternative embodiment, the mount assembly 100 may include the sealing insert 450 depicted in FIG. 13. The sealing insert 450 is similar to the embodiment of the sealing insert 150 described above except for the differences described herein. The sealing insert 450 is configured to be a solid body or plug. The sealing insert 450 may be configured to prevent objects, gas, and/or fluid from passing through the internal passage 116 of the ball mount 110. The sealing insert 450 may include a major surface 452a, a minor surface 452b, a top surface, a bottom surface 452d, a middle shoulder 452g, and an edge portion 452f. The top surface of the sealing insert 450 and the inner surface 132 of the compression fitting 130 may define a first cavity disposed at least in part in the body portion 111. The bottom surface 452d and the volume formed within the second sidewall 118 may define a second cavity disposed at least in part in the base portion 112. As such, the sealing insert 450 is configured to form a liquid-tight seal and/or an air-tight seal between the first cavity and the second cavity.

Figure 14:
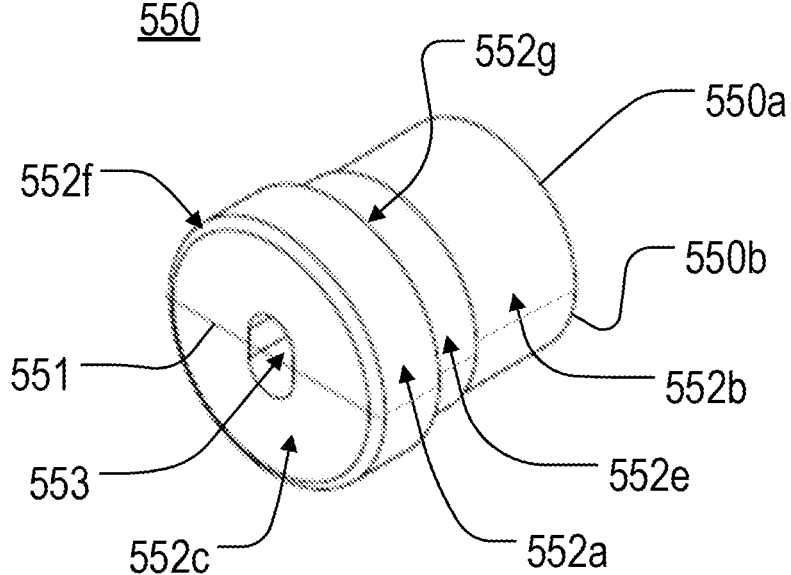
FIG. 14 is a perspective view of a sealing insert according to yet another exemplary embodiment.

According to one alternative embodiment, the mount assembly 100 may include the sealing insert 550 depicted in FIG. 14. The sealing insert 550 is similar to the embodiment of the sealing insert 150 and the sealing insert 350 described above except for the differences described herein. The sealing insert is configured to include a first sealing part 550a and a second sealing part 550b having a slit portion 551 and a cable hole 553 disposed therein. The cable hole may be configured to be substantially round in shape. The cable hole 553 is configured to extend along the sealing insert 550 in the axial direction and the slit portion 551 is configured to extend from the top surface 552c to the bottom surface of the sealing insert 550. The sealing insert 550 may further include a major surface 552a, a minor surface 552b, a top surface 552c, a bottom surface, a middle shoulder 552g, and an edge portion 552f.

As utilized herein with respect to the shape and/or configuration of various elements, the term "substantially" and similar terms generally mean+/−10% of the disclosed values, unless specified otherwise. As utilized herein with respect to structural features (e.g., to describe shape, size, orientation, direction, relative position, etc.), the term "substantially" and similar terms, are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary," "preferred," and variations thereof, as used herein to describe various embodiments, are intended to indicate that such embodiments are possible examples, representations, or illustrations of possible embodiments (and such terms are not intended to connote that such embodiments are necessarily extraordinary or superlative examples). Moreover, the claims hereof are not to be read restrictively unless there is clear and convincing evidence manifesting a certain exclusion, restriction, or disclaimer.

The term "coupled," "connected," and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ.

It is important to note that any element disclosed in one embodiment may be incorporated or utilized with any other embodiment disclosed herein. Additionally, it should be appreciated that methods of adjusting and/or using the mounted enclosure system and/or the mount assembly, as described herein, are within the scope of the invention.

What is claimed is:

1. A mount assembly comprising: a mount configured to support an enclosure in an adjustable manner, the mount comprising: a spherical body, a base configured to be coupled to the enclosure and having an external diameter larger than an external diameter of the spherical body, and a neck at which the base is coupled to the spherical body, wherein the spherical body, the base, and the neck are formed as a unitary structure, and wherein the mount has an internal passage extending through the spherical body and the base in an axial direction of the mount, the internal passage being defined by: a first sidewall having an inner surface comprising a first threaded portion, a second sidewall, wherein a diameter of an inner surface of the second sidewall is less than a diameter of an inner surface of the first sidewall, and a shoulder portion extending from the first sidewall to the second sidewall, wherein the first sidewall extends from an outer edge of the shoulder portion to an opening of the spherical body, and the second sidewall extends from an inner edge of the shoulder portion to an opening of the base, wherein the base comprises a plurality of mounting holes disposed around a periphery of the opening of the base;

a compression fitting having an outer surface comprising a second threaded portion, wherein the second threaded portion of the outer surface of the compression fitting is secured to the first threaded portion of the inner surface of the first sidewall of the mount; and a compressible sealing insert disposed in the internal passage of the mount, the sealing insert comprising: a first portion comprising an upper surface, a lower surface opposite the upper surface, and a first outer circumferential surface extending between the upper surface and the lower surface, the first portion interposed and compressed between a surface of the compression fitting and the shoulder portion in the axial direction so that a first seal is formed between the compression fitting and the sealing insert and a second seal is formed between the sealing insert and the shoulder portion, and a second portion comprising a second outer circumferential surface having a diameter less than a diameter of the first outer circumferential surface of the first portion.

2. The mount assembly of claim 1, wherein an outer surface of the compression fitting is secured to the first sidewall of the mount, and the sealing insert is configured to contact the second sidewall of the mount.

3. The mount assembly of claim 1, wherein the surface of the compression fitting includes a chamfered portion, the chamfered portion being configured to contact the sealing insert.

4. The mount assembly of claim 3, wherein:
the chamfered portion is configured to contact the sealing insert at a first distance from a center axis of the mount in a direction orthogonal to the center axis,
the inner edge of the shoulder portion is located at a second distance from the center axis of the mount in the orthogonal direction, and
the first distance is greater than the second distance.

5. The mount assembly of claim 4, wherein:
the outer edge of the shoulder portion is located at a third distance from the center axis of the mount in the orthogonal direction, and
the first distance is less than the third distance.

* * * * *